March 13, 1951     P. T. BRANTINGHAM     2,544,913
GRIT FLUSHING BEARING CONSTRUCTION
Filed Aug. 3, 1946
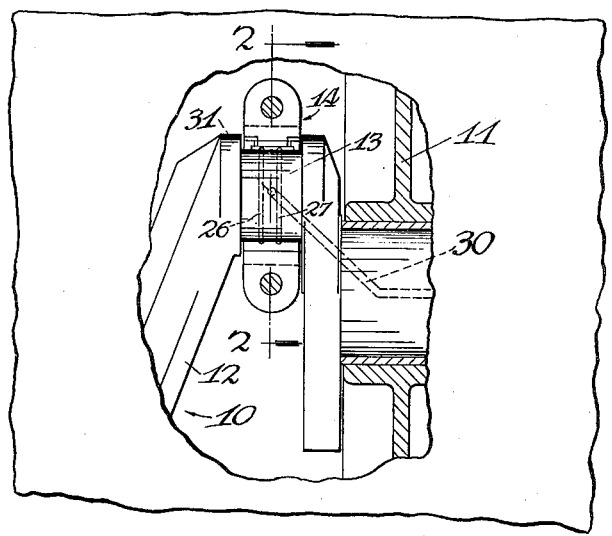
Fig. 1
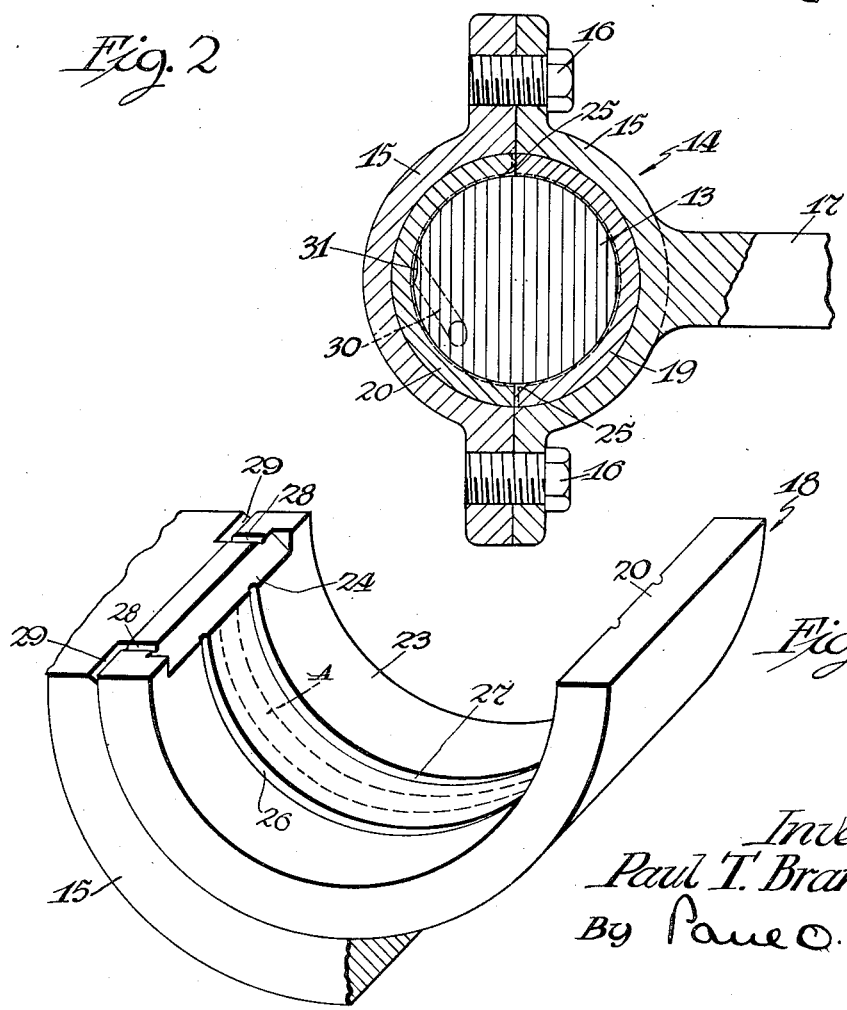
Fig. 2
Fig. 3
Inventor
Paul T. Brantingham
By Paul O. Pippel
Atty.

Patented Mar. 13, 1951

2,544,913

UNITED STATES PATENT OFFICE 2,544,913

GRIT FLUSHING BEARING CONSTRUCTION

Paul T. Brantingham, Glen Ellyn, Ill., assignor to International Harvester Company, a corporation of New Jersey Application August 3, 1946, Serial No. 688,207

8 Claims. (Cl. 308—122)

This invention relates to journal bearings and more particularly to the type of main bearings used within an internal combustion engine. More specifically it relates to means for flushing foreign-matter from a crank-shaft bearing.

Crank-shaft bearings generally consist of a pair of bearing backs or semi-circular portions which are connected around the crank shaft. The top bearing back is usually integrally formed with or connected to the lower end of a piston connecting rod. A pair of semi-circular removable sleeves formed as mating halves are positioned between the crank shaft and the bearing backs in order to provide a bearing surface. An oil pressure line consisting of a bore is formed in the crank shaft, and this bore serves to direct oil under pressure between the bearing surface of the sleeve and the crank shaft. It has generally been found advisable to form each semi-circular sleeve half with a chamfer on the bearing face at the parting line to provide for distributing oil to the bearing surfaces. This chamfer provides means to remove and flush foreign particles from the bearing.

Despite the advantages of the chamfer it was found that undue deposition of foreign particles on the bearing surface of the sleeve still resulted and particularly in relatively narrow localized bands. This deposition naturally was responsible for premature wear of the surface. The shaft or bearing portion of the crank shaft is provided with a lubrication inlet which directs oil to the bearing surfaces. This lubrication inlet is the outlet end of a diagonal bore formed in the crank shaft through which oil under pressure is delivered.

Inspection of bearings of this type indicated that most of the abrasive foreign-material in the oil passes only a short distance axially of the bearing away from the lubrication inlet and causes deposition and wear over a narrow band of the bearing surface. Such inspection also showed that the angle of the bore causes the abrasive foreign-material to be projected to one side of the lubrication inlet with the result that most of the dirt enters the bearing at such side of the inlet.

It is the prime object of this invention to provide an improved type of crank-shaft bearing wherein grit or foreign-matter in the lubricating oil is flushed from the bearing surface to the outside of the bearing at a parting line chamfer or sump.

Another object is to provide a bearing having a bearing sleeve provided with one or more grit-collecting sumps and means for flushing grit from said sumps to the exterior of the bearing.

It is another object of the invention to provide a crank-shaft bearing having a bearing surface and means contained in said bearing surface to provide grit contained in the lubrication oil to be flushed across the bearing backs of said bearing by means of metered bores.

It is another object to provide one or more circumferentially extending grooves in the bearing surface of a sleeve, said grooves serving to provide a path for collecting grit contained in the oil and carrying said grit to one or more grit-collecting sumps.

It is another object to provide a path in a bearing surface, said path being placed adjacent to an oil inlet and adapted to collect grit or other foreign-matter contained in the oil and issuing from said oil inlet.

It is another object to provide a crank-shaft bearing having means to prevent flushing of grit or other foreign-matter axially across said bearing.

A further object is to provide a crank-shaft bearing having a pair of semi-circular liner or sleeve elements suitably chamfered to provide grit-collecting sumps, said sumps having metered outlet means whereby grit contained in said sumps can be flushed outwardly of the bearing by means of the lubricating oil under pressure.

Other objects and advantages of this invention will become more readily apparent as this description proceeds when considered in connection with the accompanying drawing, wherein:

Figure 1 is a plan view of a portion of a crank shaft having a bearing element connected thereto.

Figure 2 is a sectional view taken along the line 2—2 of Figure 1, showing a portion of a crank shaft and a bearing element connected thereto.

Figure 3 is an isometric view of a portion of a crank-shaft bearing back showing a semi-circular bearing sleeve.

The invention as illustrated by said figures is embodied in a bearing construction by forming narrow circumferentially extending grooves closely adjacent the outlet opening of the lubrication supply bore formed at an angle in the crank shaft. These grooves collect a substantial portion of the abrasive material and provide means for flushing said material into chamfered sumps formed along the edges of the sleeve halves. To prevent excessive oil flow the chamfered edges are not completely cut across the sleeve but terminate spaced from the ends to block the flow of oil. Metered openings are provided in communication with the chamfered sumps and the outside of the bearing, and said openings provide for an adequate flow of oil for flushing while maintaining the desired oil pressure in the system. By such a construction a substantial portion of the abrasive foreign material is removed from the bearing with a minimum amount of wear thereto.

Referring to Figure 1, a crank shaft is generally designated by the numeral 10 which is mounted for rotation in a supporting structure 11. The crank shaft 10 is provided with crank arms 12 and a shaft portion 13 around which is connected a bearing element generally designated by the numeral 14. The bearing 14 consists of a pair of semi-circular bearing backs 15 suitably connected around said shaft portion 13 by means of screws 16. The top bearing back 15 is integrally formed with a piston connecting rod 17, only a portion of which is shown.

A sleeve or liner element generally indicated at 18 is connected between the bearing backs 15 and the shaft portion 13. The liner element 18 consists of a pair of semi-circular mating halves 19 and 20. Each sleeve portion 19 and 20 is formed with a bearing surface 23 which is in contact with the shaft portion 13. Each sleeve half 19 and 20 is provided with an axial chamfered portion 24 extending partially throughout the width of the sleeve portion. The chamfer portions 24 are positioned to provide a grit-collecting sump 25 formed at the transverse ends of each sleeve.

A pair of axially spaced and circumferentially extending grooves 26 and 27 are formed in the bearing surface 23. The grooves 26 and 27 are in communication with the sumps 25 and are suitably spaced to provide gathering troughs for grit and dirt as will presently be described.

Each sleeve half 19 and 20 is provided with a transversely extending oil discharge opening 28 directly in communication with the sumps 25. Each bearing back 15 is provided at its parting line with axially extending troughs 29 directly in communication with the opening 28 and extending to the outer portion of the bearing. The trough 29 and opening 28 are the openings which are considered "metered." By this term is meant that the openings are sufficiently large to permit an unrestricted escape of the foreign matter or dirt which has collected in the chamber. Yet these openings also are of a predetermined size so that the oil pressure in the system is maintained without any substantial pressure drop.

In operation, lubricating oil is provided under pressure to a diagonal bore 30 formed in the crank shaft 10. The bore 30 extends to an oil inlet opening 31 formed in the shaft 13. The oil inlet opening 31 is positioned intermediate the grooves 26 and 27. As the crank shaft rotates, this oil inlet follows the circumferential path indicated by the broken lines A indicated in Figure 3, and the initial point of entry for the oil is, of course, along this path. As a consequence thereof the dirt in the oil would be normally deposited along the path A and would in most instances form a band of deposited foreign material immediately adjacent to said path. Depending on the angle of the bore 30, this band would generally be on the side opposite said bore and would not be directly on the center line or path of travel of the oil inlet 31. It is for this reason that the groove 26 is placed immediately adjacent said opening so that the foreign-matter collects in said groove. As indicated in Figure 1, the bore 26 will collect the grit since the angled groove 30 is to the right of the center line. If this bore were positioned to the left of the center line, then the groove 27 would collect the grit. The groove 26 forms a receiving trough for this dirt, and the dirt is carried to the sumps 25. Thus the damage to the bearing, which this grit normally would cause, is avoided. The groove 27 is provided to make the sleeve interchangeable regardless of the position or angle of the diagonal bore in the crank-shaft and also to collect foreign particles that may be flushed to the opposite side.

The foreign-matter is thus continually gathering in the sumps 25 and is immediately flushed therefrom by the lubricating oil under pressure, said foreign-matter being discharged from the bearing by means of the troughs 29. During rotation of the shaft 13 the oil opening 31 is momentarily and intermittently in communication with the sumps 25, and the force of the oil pressure directly upon the sumps is sufficient to cause a greater immediate discharge of any grit which has been deposited in the sumps.

It can thus be seen that the problem of the deposited grit adjacent to the oil inlet and subsequent wear has been eliminated by the grooves 26 and 27 which collects and carries it to the sumps 25. The sumps are so constructed that oil pressure is maintained and at the same time provisions for the escape and ejection of grit are provided. The metered openings, in communication with the sumps and the outside of the bearing, provide for a positive cleaning of the sumps and the bearing surfaces of the sleeve.

It is to be understood that modifications of this invention may be made which do not depart from the intent of the invention as disclosed nor the scope thereof as defined in the appended claims.

What is claimed is:

1. A bearing comprising a pair of semi-circular back portions connected together for rotation about a shaft, a sleeve element cooperating with said back portions to provide a bearing surface, a pair of depressions formed in the bearing surface of said sleeve element to provide grit-collecting sumps, a groove formed in said bearing surface and communicating with said sumps, said groove providing means for channeling collected foreign-matter to said sumps, means for supplying oil under pressure to said groove, and a pair of oil discharge outlets axially formed at the parting line of said back portions, said discharge outlets being in direct communication with said sumps and the outer portion of said bearing and being arranged and constructed to provide for the unrestricted immediate flushing of grit from the sumps of said bearing to the outer surface thereof and of metered cross-sectional dimension to substantially maintain the oil pressure to said bearing.

2. A bearing comprising a pair of semi-circular back portions connected together for rotation about a shaft, a pair of semi-circular sleeve elements, each sleeve element cooperating with each back portion to form a bearing surface, one parting line chamfer formed in the bearing surface of each sleeve to provide grit-collecting sumps, a groove formed in said sleeve and extending circumferentially for communication with said sumps, said groove providing means for collecting and channeling grit to said sumps, means for supplying oil under pressure to said bearing surface, and a pair of axially extending troughs formed at the parting line end of each back portion, said troughs being in direct communication with said sumps and being arranged and constructed to provide for the unrestricted immediate flushing of grit from the sumps of said bearing to the outer surface thereof and of metered cross-sectional dimension to substantially maintain the oil pressure to said bearing.

3. A bearing comprising a pair of semi-circular back portions connected together for rotation about a shaft, a pair of semi-circular sleeve elements, each sleeve element cooperating with each back portion to form a bearing surface, one parting line chamfer formed in the bearing surface of each sleeve to provide grit-collecting sumps, a plurality of circumferentially extending grooves formed in said bearing surface, each of said grooves providing a circumferential grit-collecting path terminating at said sumps, means for supplying oil under pressure to each of said paths, and a pair of axially extending troughs formed at the parting line end of each back portion, said troughs being in communication with said sumps and the outer portion of said bearing and being arranged and constructed to provide for the unrestricted immediate flushing of grit from the sumps of said bearing to the outer surface thereof and of metered cross-sectional dimension to substantially maintain the oil pressure to said bearing.

4. A bearing comprising a pair of semi-circular back portions connected together for rotation about a shaft, a pair of semi-circular sleeve elements, each sleeve element cooperating with each back portion to form a bearing surface, one parting line chamfer formed in the bearing surface of each sleeve to provide grit-collecting sumps, a plurality of circumferentially extending grooves formed in said bearing surface, said grooves being adapted to collect and channel foreign particles to said sumps, means for supplying oil under pressure to said bearing surface, a pair of oil discharge bores extending transversely through said sleeve element, said discharge bores being in communication with said sumps, and a pair of axially extending troughs formed at the parting line end of each back portion, said troughs being in communication with said transverse bores and being arranged and constructed to provide for the unrestricted immediate flushing of grit from the sumps of said bearing to the outer surface thereof and of metered cross-sectional dimension to substantially maintain the oil pressure to said bearing.

5. A bearing comprising a pair of semi-circular back portions connected together for rotation about a shaft, a pair of semi-circular sleeve elements, each sleeve element cooperating with each back portion to form a bearing surface, a chamfer formed at the end of each sleeve and in the bearing surface thereof to provide grit-collecting sumps, a plurality of circumferentially extending grooves formed in said bearing surface and in communication with said sumps, means for supplying lubricating fluid under pressure to said bearing surface, a pair of discharge bores formed in each sleeve element and in communication with said sumps, said discharge bores extending transversely through the thickness of each sleeve element, and a pair of axially extending troughs formed at the parting line end of each back portion, said troughs being in communication with said transverse bores and being arranged and constructed to provide for the unrestricted immediate flushing of grit from the sumps of said bearing to the outer surface thereof and of metered cross-sectional dimension to substantially maintain the oil pressure to said bearing.

6. In combination, a crank shaft having an oil conduit for transmitting oil under pressure, a bearing for said crank shaft comprising, a pair of semi-circular back portions connected together for rotation about said crank shaft, a pair of semi-circular sleeve elements, each sleeve element cooperating with each back portion to provide a bearing surface, a plurality of depressions formed in said bearing surface to provide grit-collecting sumps, a plurality of grit-collecting grooves circumferentially formed in said bearing surface and in communication with said sumps, a discharge outlet in direct communication with each sump and the outer portion of said bearing, said sumps and said crank-shaft oil conduit being in momentary alignment with one another upon rotation of said crank shaft, thereby intermittently providing direct pressure on said sumps for flushing collected grit from said sumps through said discharge outlets.

7. In combination, a crank shaft having an oil conduit for transmitting oil under pressure, a bearing for said crank shaft comprising, a pair of semi-circular back portions connected together for rotation about said crank shaft, a pair of semi-circular sleeve elements, each sleeve element cooperating with each back portion to provide a bearing surface, a plurality of axially extending depressions formed in said bearing surface to provide grit-collecting sumps, a grit-collecting groove circumferentially formed in said bearing surface and in communication with said sumps, a discharge outlet for each sump, each discharge outlet being in direct communication with a sump and the outer portion of said bearing, said sumps and said crank-shaft oil conduit being in momentary alignment with one another upon rotation of said crank shaft, thereby intermittently providing direct pressure on said sumps for flushing collected grit from said sumps through said discharge outlets.

8. A bearing comprising a pair of semi-circular back portions connected together for rotation about a shaft, a sleeve element cooperating with said back portions to provide a bearing surface, a depression formed in the bearing surface of said sleeve element to provide a grit-collecting sump, a groove formed in said bearing surface and communicating with said sump, said groove providing means for channeling foreign matter and oil under pressure to said sump, and a discharge outlet axially positioned to communicate with said sump and the outer portion of said bearing, said discharge outlet being arranged and constructed to provide for the unrestricted immediate flushing of grit from the sump of said bearing to the outer surface thereof and of metered cross-sectional dimension to substantially maintain the oil pressure to said bearing.

PAUL T. BRANTINGHAM.

REFERENCES CITED

The following references are of record in the file of this patent:

FOREIGN PATENTS

| Number | Country | Date |
|---|---|---|
| 664,788 | Germany | Sept. 6, 1938 |